(12) United States Patent
Gluckstad

(10) Patent No.: US 7,492,948 B2
(45) Date of Patent: Feb. 17, 2009

(54) GENERATION OF A DESIRED WAVEFRONT WITH A PLURALITY OF PHASE CONTRAST FILTERS

(75) Inventor: Jesper Gluckstad, Frederiksberg (DK)

(73) Assignee: Denmarks Tekniske Universitet, Lyngby (DK)

( * ) Notice: Subject to any disclaimer, the term of this patent is extended or adjusted under 35 U.S.C. 154(b) by 448 days.

(21) Appl. No.: 10/562,017

(22) PCT Filed: Jun. 25, 2004

(86) PCT No.: PCT/DK2004/000452

§ 371 (c)(1), (2), (4) Date: May 17, 2006

(87) PCT Pub. No.: WO2004/113993

PCT Pub. Date: Dec. 29, 2004

(65) Prior Publication Data

US 2006/0227440 A1    Oct. 12, 2006

(30) Foreign Application Priority Data

Jun. 26, 2003   (DK) ............................... 2003 00966

(51) Int. Cl.
*G06K 9/76* (2006.01)

(52) U.S. Cl. ...................................... 382/211; 382/210

(58) Field of Classification Search .................... None
See application file for complete search history.

(56) References Cited

U.S. PATENT DOCUMENTS

| 2,662,187 A | 12/1953 | Kavanagh |
|---|---|---|
| 3,729,252 A | 4/1973 | Nelson |
| 2003/0030902 A1 | 2/2003 | Fukushima et al. |

FOREIGN PATENT DOCUMENTS

| WO | WO 96/34307 | 10/1996 |
|---|---|---|
| WO | WO 02/052332 A2 | 7/2002 |

OTHER PUBLICATIONS

Paul C. Mogensen and Jesper Gluckstad, Dynamic Array Generation and Pattern Formation for Optical Tweezers, Optics Communications 175 (2000) 75-81, Dec. 15, 1999.
Jesper Gluckstad, Phase Contrast Image Synthesis, Optics Communications 130 (1996) 225-230, May 10, 1996.

*Primary Examiner*—Matthew C Bella
*Assistant Examiner*—Claire Wang
(74) *Attorney, Agent, or Firm*—Volentine & Whitt, P.L.L.C.

(57) ABSTRACT

The present invention relates to a method and a system for synthesizing an intensity pattern based on generalized phase contrast imaging. The phase filter contains a plurality of phase shifting regions that is matched to the layout of a light source array, each of the regions being positioned at the zero-order diffraction region of a respective element of the array. Further, the shape of each phase shifting region may match the shape of the zero-order diffraction region of the respective element. Thus, the energy of the electromagnetic fields of the system may be distributed over a large area compared to the area of a zero-order diffraction region of a single plane electromagnetic field of a known phase contrast imaging system.

22 Claims, 5 Drawing Sheets

US 7,492,948 B2

GENERATION OF A DESIRED WAVEFRONT WITH A PLURALITY OF PHASE CONTRAST FILTERS

CROSS-REFERENCE TO RELATED APPLICATIONS

This application is the national phase under 35 U.S.C. 371 of PCT International Application No. PCT/DK2004/000452 which has an international filing date of Jun. 25, 2004, and also claims priority under 35 U.S.C. 119 to Danish application PA 2003 00966 filed on Jun. 23, 2003, both of which applications are hereby incorporated by reference in their entirety for all purposes as if fully set forth herein.

FIELD OF THE INVENTION

The present invention relates to a method and a system for synthesizing a prescribed intensity pattern based on generalized phase contrast imaging.

BACKGROUND OF THE INVENTION

It is well known to form an image by phase contrast imaging methods in which phase modulation of light is converted into intensity modulation. As opposed to intensity modulation, phase modulation does not involve loss of energy.

A generalized phase contrast imaging method and system is disclosed in International Patent Application Publication No. WO 96/34207 for synthesizing a prescribed intensity pattern. The generalized method is not based on the so-called Zernike approximation that the phase shift $\phi$ is less than 1 radian. An improved method is provided without this assumption and based on an imaging operation with a simple one-to-one mapping between resolution elements or pixels of a spatial phase modulator and resolution elements of the generated intensity pattern.

The disclosed phase contrast imaging method of synthesizing a prescribed intensity pattern $I(x',y')$, comprises the steps of:

dividing the intensity pattern $I(x',y')$ into pixels in accordance with the disposition of resolution elements $(x,y)$ of a spatial phase mask having
  a plurality of individual resolution elements $(x,y)$, each resolution element $(x,y)$ modulating the phase of electromagnetic radiation incident upon it with a predetermined phasor value $e^{i\phi(x,y)}$, radiating electromagnetic radiation towards the spatial phase mask, Fourier or Fresnel transforming the modulated electromagnetic radiation, phase shifting with a spatial phase filter (SPF) in a region of spatial frequencies comprising DC in the Fourier or Fresnel plane, the modulated electromagnetic radiation by a predetermined phase shift value $\theta$ in relation to the remaining part of the electromagnetic radiation, and forming the intensity pattern by Fourier or Fresnel transforming, respectively, the phase shifted Fourier or Fresnel transformed modulated electromagnetic radiation, whereby each resolution element $(x,y)$ of the phase mask is imaged on a corresponding resolution element $(x',y')$ of the image, calculating the phasor values $e^{i\phi(x,y)}$ of the phase mask and the phase shift value $\theta$ in accordance with $$I(x',y') = |e^{i\phi(x',y')} + \bar{\alpha}(e^{i\theta} - 1)|^2$$

for selected phase shift values $\theta$, $\bar{\alpha}$ being the average of the phasors $e^{i\phi(x,y)}$ of the resolution elements of the phase mask, selecting, for each resolution element, one of two phasor values which represent a particular grey level, and supplying the selected phasor values $e^{i\phi(x,y)}$ to the resolution elements $(x,y)$ of the spatial phase mask.

In one embodiment disclosed in WO 96/34207, the spatial phase mask is positioned at the front focal plane of a lens while the spatial phase filter is positioned in the back focal plane of the lens, whereby a first electromagnetic field at the spatial phase mask is Fourier transformed by the lens into a second electromagnetic field at the spatial phase filter. Thus, specific spatial frequencies of the first electromagnetic field will be transmitted through the spatial phase filter at specific positions of the phase filter. For instance, the energy of the electromagnetic radiation at zero frequency (DC) is modified by the phase filter and transformed onto the intersecting point of the Fourier plane and the optical axis of the lens also denoted the zero-order diffraction region.

Typically, the spatial phase filter is adapted to phase shift the DC-part of the electromagnetic radiation and to leave the remaining part of the electromagnetic radiation unchanged. Alternatively, the DC-part of the electromagnetic radiation remains unchanged and the remaining part of the electromagnetic radiation is phase shifted. This alternative is preferred when the energy level of the DC-part of the electromagnetic radiation is so high that the phase shifting part of the phase filter will be destroyed by it. For example in laser cutting, the DC level of the laser beam can be so high that a phase shifting dot positioned at the intersecting point of the DC part of the laser beam at the phase filter would deteriorate. It is also possible to block the electromagnetic radiation (no transmittance) in the zero-order diffraction region, however, the DC energy of the radiation is then lost.

In US 2003/0030902 a microscope system is disclosed for obtaining images of optimum image quality comprising 1) an illuminating device which emits light from a light source to an object, and generates a luminous flux including information of the object, 2) an illuminating light modulating device which modulates at least one of wavelength, phase, intensity, polarization, and coherency of the light emitted to the object by the illuminating device, 3) an objective lens and an imaging lens which focus the luminous flux including the information of the object to form the image of the object, 4) a pupil modulating device which is disposed near a pupil plane of the objective lens, and modulates at least one of phase, intensity and direction of polarization of the luminous flux including the information of the object, 5) an image pickup device which is disposed on a plane on which the image of the object is formed by the objective lens and the imaging lens, and picks up the image of the object, 6) an image display device which displays the image of the object picked up by the image pickup device, 7) an image analysis device which analyses the image of the object picked up by the image pickup device, and 8) a parameter decision device which adjusts the modulation amounts of the illuminating light modulating device and the pupil modulating device by using the image information of the object analysed by the image analysis device.

The pupil modulating device is a phase filter and in one of the disclosed embodiments (FIG. 7) the phase shift is equal to $$\frac{\pi}{2}$$

and the phase shifting area of the phase filter is annular. In another of the enclosed embodiments (FIG. 9) the phase shift is equal to π and the phase filter is divided into a plurality of rows, every second row having phasor value $e^{i\pi}$ and being interlaced with the remaining rows having the phasor value $e^{i0}$.

US 2003/0030902 does not disclose a method of synthesizing an intensity pattern by designing a phase modifying element with phasor values $e^{i\phi(x,y)}$ calculated from intensity values of the desired intensity pattern. In US 2003/0030902, the phase modifying element is a sample that is obtained for studying it in a microscope. The sample is not designed with the purpose of generating a certain intensity pattern.

SUMMARY OF THE INVENTION

The previously mentioned known method of synthesizing a specific intensity pattern operates on a plane incoming electromagnetic field.

It is an object of the present invention to provide a method and a system for synthesizing an intensity pattern operating on a more complex electromagnetic field than the known method for further flexibility, e.g., to be able to utilize light sources that are not based on a single collimated point source, such as laser arrays, VCSEL-arrays, LED-arrays etc.

Further, the spatial phase filter according to the known method processes an incident electromagnetic field in the very small diffraction region only, e.g. the zero-order diffraction region, leaving the remaining part of the filter un-utilized. Distributing the spatial processing of an electromagnetic field across a larger area of the spatial phase filter would make the filter capable of handling higher energy levels. Further, it should be possible to match the phase shifting regions of the spatial phase filter to a source for emission of electromagnetic radiation that cannot be considered to constitute a point source, because it emits radiation from a large area.

According to a first aspect of the present invention, the above and other objects are fulfilled by a phase contrast system for synthesizing an intensity pattern I(x', y'), comprising
- a source of electromagnetic fields for emission of at least two substantially plane electromagnetic fields with different axes of propagation,
- a phase modifying element for phase modulation of the electromagnetic fields by phasor values $e^{i\phi(x,y)}$ and positioned so that the at least two electromagnetic fields are incident upon it at different respective angles of approach,
- first Fourier or Fresnel optics for Fourier or Fresnel transforming the phase modulated electromagnetic fields positioned in the propagation paths of the at least two phase modulated fields,
- a spatial phase filter with at least two phase shifting regions positioned at respective zero-order diffraction regions of the at least two respective phase modulated electromagnetic fields for individually phase shifting the at least two respective Fourier or Fresnel transformed electromagnetic fields by predetermined respective phase shift values $\theta_n$ in relation to the remaining part of the at least two respective transformed electromagnetic fields, and
- second Fourier or Fresnel optics for forming the intensity pattern I(x', y') by Fourier or Fresnel transforming the at least two respective phase shifted Fourier or Fresnel transformed electromagnetic fields,
    the phasor values $e^{i\phi(x,y)}$ of the phase modifying element and the phase shift values $\theta_n$ substantially fulfilling that $$I(x',y') \cong \sum_n S(n)A^2 |\exp(i\tilde{\phi}(x',y')) + K_n|\bar{\alpha}|(B_n A^{-1}\exp(i\theta_n) - 1)|^2$$

for selected phase shift values $\theta_n$, wherein

A is an optional amplitude modulation of the spatial phase filter outside the zero-order diffraction regions, $B_n$ is an optional amplitude modulation of the spatial phase filter in the respective n'th zero-order diffraction region, $\bar{\alpha} = |\bar{\alpha}|\exp(i\phi_{\bar{\alpha}})$ is the average of the phasors $e^{i\phi(x,y)}$ of the resolution elements of the phase modifying element, and $\tilde{\phi} = \phi - \phi_{\bar{\alpha}}$, and S(n) is the intensity of the n'th electromagnetic field, and $K_n = 1 - J_0(1.227\pi\eta_n)$, wherein $J_0$ is the zero-order Bessel function and $\eta_n$ relates the radius $R_{1n}$ of the n'th zero-order filtering region to the radius $R_2$ of the main-lobe of the Airy function of the input aperture, $\eta_n = R_{1n}/R_2$.

According to a second aspect of the present invention, the above and other objects are fulfilled by a method for synthesizing an intensity pattern I(x',y'), comprising the steps of
- dividing the intensity pattern I(x',y') into pixels in accordance with the disposition of resolution elements (x,y) of a phase modifying element having
    a plurality of individual resolution elements (x,y), each resolution element (x,y) modulating the phase of electromagnetic radiation incident upon it with a predetermined phasor value $e^{i\phi(x,y)}$,
- radiating at least two substantially plane electromagnetic fields with different axes of propagation towards the phase modifying element so that the at least two electromagnetic fields are incident upon it at different respective angles of approach,
- Fourier or Fresnel transforming the phase modulated electromagnetic fields,
- phase shifting in at least two phase shifting regions positioned at respective zero-order diffraction regions of the at least two respective phase modulated electromagnetic fields for individually phase shifting the at least two respective Fourier or Fresnel transformed electromagnetic fields by predetermined respective phase shift values $\theta_n$ in relation to the remaining part of the at least two respective transformed electromagnetic fields, and
- forming the intensity pattern I(x', y') by Fourier or Fresnel transforming the at least two respective phase shifted Fourier or Fresnel transformed electromagnetic fields,
- calculating the phasor values $e^{i\phi(x,y)}$ of the phase modifying element and the phase shift values $\theta_n$ substantially in accordance with $$I(x',y') \cong \sum_n S(n)A^2 |\exp(i\tilde{\phi}(x',y')) + K_n|\bar{\alpha}|(B_n A^{-1}\exp(i\theta_n) - 1)|^2$$

for selected phase shift values $\theta_n$, wherein

A is an optional amplitude modulation of the spatial phase filter outside the zero-order diffraction regions, $B_n$ is an optional amplitude modulation of the spatial phase filter in the respective n'th zero-order diffraction region, $\overline{\alpha} = |\overline{\alpha}| \exp(i\phi_{\overline{\alpha}})$ is the average of the phasors $e^{i\phi(x,y)}$ of the resolution elements of the phase modifying element, and $\phi = \Phi - \phi_{\overline{\alpha}}$, and S(n) is the intensity of the n'th electromagnetic field, and $K_n = 1 - J_0(1.22\pi\eta_n)$, wherein $J_0$ is the zero-order Bessel function and $\eta_n$ relates the radius $R_{1n}$ of the n'th zero-order filtering region to the radius $R_2$ of the main-lobe of the Airy function of the input aperture, $\eta_n = R_{1n}/R_2$.

selecting, for each resolution element, one of two phasor values which represent a particular grey level, and supplying the selected phasor values $e^{i\phi(x,y)}$ to the respective resolution elements (x, y) of the phase modifying element.

The mathematical expressions will be further explained below.

The axis of propagation of a plane electromagnetic field is perpendicular to the electric and magnetic fields.

In an embodiment of the present invention, the phase modifying element has an input for reception of signals for addressing the resolution elements (x, y) and for adjusting the phasor values $e^{i\phi(x,y)}$ of the respective addressed resolution elements (x, y).

The system may further comprise a controller with a first output that is connected to the input of phase modifying element, and a second output that is connected to the spatial phase filter and being adapted for adjusting phasor values $e^{i\phi(x,y)}$ of the phase modifying element and phase shift values $\theta_n$ of the spatial phase filter. Preferably, the at least two substantially plane electromagnetic fields are non-interfering i.e. the fields are mutually incoherent and/or orthogonally polarized and/or have different wavelengths, etc.

It should be noted that, in each resolution element of the phase modifying element, one of two phasor values which represent a particular grey level of the intensity pattern I(x',y') may be selected.

In an embodiment of the present invention, the spatial phase filter substantially does not attenuate the electromagnetic fields incident upon it outside the phase shifting regions, i. e. A is equal to one or approximately equal to one.

In an embodiment of the present invention, the spatial phase filter substantially does not attenuate the electromagnetic fields incident upon it inside the phase shifting regions, i.e. $B_n$ is equal to one or approximately equal to one.

It is also preferred that the phase shift value $\theta_n$ substantially fulfills the equation $$K_n|\overline{\alpha}| = \frac{1}{2\left|\sin\frac{\theta_n}{2}\right|}$$

for a loss less filter with A=1 and $B_n$=1. In a preferred embodiment of the present invention, the phase shift $\theta_n$ is equal to $\pi$ or approximately equal to $\pi$. Accordingly the previous equation leads to $K_n\overline{\alpha} = \frac{1}{2}$ and the phase values $\phi(x,y)$ of the phase modifying element may be calculated in accordance with $$\begin{cases} K_n A^{-1} \int_A \int \cos(\phi(x, y)) dx dy = 1/2 \\ K_n A^{-1} \int_A \int \sin(\phi(x, y)) dx dy = 0 \end{cases}$$

where A is the illuminated area of the phase modifying element.

The electromagnetic field or radiation may be of any frequency range of the electromagnetic spectrum, i.e. the gamma frequency range, the ultraviolet range, the visible range, the infrared range, the far infrared range, the X-ray range, the microwave range, the HF (high frequency) range, etc. The present invention is also applicable to particle radiation, such as electron radiation, neutron radiation, etc.

Preferably, the electromagnetic fields are monochromatic or quasi-monochromatic so that the energy of the electromagnetic fields is concentrated in a narrow frequency bandwidth.

Since the intensity pattern is reconstructed by, for each of the incoming plane fields, interference of two electromagnetic fields generated by different phase shifting of different parts of the incoming field, it is required that the frequency range of the emitted electromagnetic field is sufficiently narrow to ensure that the two electromagnetic fields are coherent so that their superposition generates the desired intensity pattern. If the frequency range is too broad, the two fields will be incoherent and the phase information will be lost as superposition of non-coherent fields results in a summation of the intensities of the two fields. It is required that the difference between individual delays of electromagnetic fields to be superpositioned is less than the wavelength of the fields. This is a relaxed requirement that allows the electromagnetic fields to be relatively broad-banded. For example in the visible range, a Xe-lamp or a Hg-lamp can be used as a light source in a system according to the present invention with the advantage compared to a laser light source that speckle noise is reduced. The requirements of the spatial coherence of the electromagnetic fields depend upon the space bandwidth product of the corresponding system and how close the required system performance is to the theoretically obtainable performance of the system.

Preferably, the electromagnetic radiation is generated by a coherent source of electromagnetic radiation, such as a laser, a semi-conductor laser, a strained multi-quantum well laser, a vertical cavity surface emitting laser (VCSEL), a maser, a phase-locked laser diode array, a light emitting diode, a pulsed laser, such as a sub-picosecond laser, etc, or an array of such sources. However, as already mentioned, a high-pressure arc lamp, such as an Hg lamp, a Xe lamp, etc, may also be used and even an incandescent lamp may be used as a source of electromagnetic radiation.

The phase modifying element changes the phase of an electromagnetic field incident upon it. Optionally, it may also change the amplitude of an electromagnetic field incident upon it. The phase modifying element may transmit or reflect the incident electromagnetic field. The phase modifying element is divided into a number of resolution elements, each of which modulates the incident electromagnetic field by changing its phase by a specific predetermined value. The predetermined values are assigned to each resolution element in different ways depending upon the technology applied in the component. For example in spatial light modulators, each resolution element may be addressed either optically or electrically. The electrical addressing technique resembles the addressing technique of solid-state memories in that each resolution element can be addressed through electronic circuitry to receive a control signal corresponding to the phase change to be generated by the addressed resolution element. The optical addressing technique addresses each resolution element by pointing a light beam on it, the intensity of the light beam corresponding to the phase change to be generated by the resolution element illuminated by the light beam.

Spatial phase modulation may be realized utilizing fixed phase mask, a liquid crystal device based on liquid crystal display technology, a MEMS (micro electromechanical system), a MOEMS (micro opto-electro-mechanical system), such as a dynamic mirror device, a digital micro-mirror array, a deformable mirror device, etc, a membrane spatial light modulator, a laser diode array (integrated light source and phase modulator), smart pixel arrays, etc.

Seiko-Epson produces a transmitting liquid crystal SLM (LC-SLM) having a high resolution matrix of transparent liquid crystal elements wherein the relative permittivity of each element can be electrically modulated in order to vary the refractive index and thereby the optical path length of the element.

Meadowlark produces a parallel-aligned liquid crystal (PAL-SLM) with a high fill factor, but this device has a very low resolution in that it contains only 137 phase-modulating elements.

Hamamatsu Photonics produces a dynamically controllable PAL-SLM with VGA or XGA resolution.

Texas Instruments produces a Digital Mirror Device (DMD) having an array of mirrors each of which can be tilted between two positions.

In an embodiment of the invention, the phasor values are contained in an object that is not controlled by the system, e.g. a specimen in a slide, in stead they are detected in the system.

The spatial phase filter is typically a fixed phase mask, such as an optically flat glass plate coated with a dielectric layer in the region wherein the modulated electromagnetic field is phase shifted $\theta_n$ in relation to the remaining part of the electromagnetic field. However, the spatial phase modulators mentioned in the previous section may also be used for spatial phase filters. In addition, non-linear materials providing for self-phase modulation such as Kerr-type materials can also be used for introducing phase shift $\theta_n$.

An imaging system maps the phase modulating resolution elements of the phase modifying element on the target surface of the reconstructed intensity pattern. It may comprise a 4f-lens configuration (two Fourier transforming lenses utilizing transmission of light or one Fourier transforming lens utilizing reflection of light) or a single imaging lens. However, any optical imaging system providing a filtering plane for the spatial phase filter may be applied in a phase contrast imaging system.

In the method and system according to the present invention, the intensity pattern I(x', y') is generated by superposition of electromagnetic fields in the image plane of the imaging system. The phase modifying element changes the phase values of an electromagnetic field incident upon it and the imaging system directs the electromagnetic field with changed phases reflected from or transmitted through the phase modifying element towards the spatial phase filter. The phase filter phase shifts a part of the electromagnetic field and the imaging system is adapted to superimpose in the image plane the phase shifted part of the electromagnetic field with the part of the electromagnetic field that is not phase shifted by the spatial phase filter.

According to a preferred embodiment of the invention, the phase modifying element is positioned at the front focal plane of a lens while the spatial phase filter is positioned in the back focal plane of the lens, whereby a first electromagnetic field at the phase modifying element is Fourier transformed by the lens into a second electromagnetic field at the phase filter. Thus, specific spatial frequencies of the first electromagnetic field will be transmitted through the spatial phase filter at specific positions of the phase filter. For instance, the energy of the electromagnetic field at zero frequency (DC) is transmitted through the phase filter at the intersecting point of the Fourier plane and the optical axis of the lens also denoted the zero-order diffraction region.

It is an important advantage of the invention that utilisation of arrays of sources is facilitated in that the positioning and/or shapes of the phase shifting regions of the phase filter may be matched to the geometry of the source. For example, if a linear array of VCSELs forms the source, the phase shifting regions of the spatial phase filter form a corresponding linear array of phase shifting regions, each of the regions being positioned at the zero-order diffraction region of a respective VCSEL in the VCSEL array. Further, the shape of each phase shifting region may match the shape of the zero-order diffraction region of the respective VCSEL.

Likewise, a phase filter may match a source with a specific geometrical shape with a continuous phase shifting region covering an area of the phase filter that corresponds to the zero-order diffraction region of the source.

Thus, the energy of the electromagnetic fields of the system may be distributed over a large area compared to the area of a zero-order diffraction region of a single plane electromagnetic field of a known phase contrast imaging system.

Thus, the phase shifting regions of the spatial phase filter may form a rectangular array, a circular array, a linear array, two linear crossing arrays, a continuous region, a ring, etc.

The at least two substantially plane electromagnetic fields with different axes of propagation may be generated in a time multiplexed manner, e.g. by a scanning mirror or prism, deflecting or reflecting a beam of electromagnetic field in different directions of propagation.

The capability of handling high energy levels of electromagnetic fields of the present invention may be utilized for provision of a laser cutter comprising a system according to the present invention.

Further, the capability of handling high energy levels in combination with the capability of generating crossing light beams may be utilized for provision of an optical tweezer or an array of optical tweezers according to the present invention.

In an embodiment of the present invention, wherein the apertures of the system is of insignificant importance to the operation of the system and calculation of the phasor values, i.e. $K_n$ is equal to one or approximately equal to one.

For a more detailed understanding of the invention, the Zernike approximation is reviewed below, followed by a generalization where the above-mentioned mathematical expressions are derived for a single (n=1) on-axis centred phase contrast filtering implementation.

The Zernike phase contrast method allows for the visualization of phase perturbations by the use of a Fourier plane phase shifting filter. The Dutch physicist Fritz Zernike received the Nobel Prize in 1953 for inventing this method, which led to a break-through in medicine and biology by making essentially transparent cell or bacteria samples clearly visible under a microscope. Its successful operation, however, requires that the spatial phase distribution, $\phi(x,y)$, at the input is limited to a "small-scale" phase approximation where the largest phase is typically taken to be significantly less than $\pi/3$. If the phase distribution at the input is thus restricted, then a Taylor expansion to first order is sufficient for the mathematical treatment so that the input wavefront can be written as $$\exp(i\phi(x,y)) \approx 1 + i\phi(x,y) \tag{1}$$

The light corresponding to the two terms in this "small-scale" phase approximation can be separated spatially by use of a single lens where the phase distribution is located in the front focal plane and the corresponding spatial Fourier transformation is generated in the back focal plane of the lens. In this first order approximation the constant term represents the amplitude of on-axis light focused by the lens in the back focal plane and the second spatially varying term represents the off-axis light. Zernike realized that a small phase shifting quarter wave plate acting on the focused light makes it possible to obtain an approximately linear visualization of small phase structures by generating interference between the two-phase quadrature terms in Eq. (1):

$$I(x',y') \approx 1 + 2\phi(x',y') \tag{2}$$

It should be noted that a three-quarter waveplate works equally well to produce contrast, but the plus sign in Eq. (2) is negated leading to so-called negative phase contrast. A substantial improvement in the visibility of the Zernike phase contrast visualization in Eq. (2) requires strong damping of the focused light in addition to the phase shift required to generate the contrast.

In the general case, where we are not limited to a small-scale input phase perturbation we cannot assume that a series expansion to first order as in the Zernike approximation is a sufficient representation of a given phase perturbation. Higher order terms in the expansion need to be taken into account, so the expansion takes the form:

$$\exp(i\phi(x,y)) = \tag{3}$$
$$1 + i\phi(x,y) - \frac{1}{2}\phi^2(x,y) - \frac{1}{6}i\phi^3(x,y) + \frac{1}{24}\phi^4(x,y) + \ldots$$

However, here the spatially varying terms can not be considered as separate from the supposedly focused light represented by the first term in this Taylor series expansion, as is implied by the Zernike approach, and all of these spatially varying terms contribute to the intensity of the on-axis focused light. For a significant modulation in the input phase, this contribution of the spatially varying terms can result in a significant modulation of the focal spot amplitude in the back focal plane of the lens. These terms can in fact result in either constructive or destructive interference with the on-axis light, although the net result will be an attenuation of the focused light amplitude, which only has a maximum value for a perfect unperturbed plane wave at the input.

For phase objects breaking the Zernike approximation we must, therefore, find an alternative mathematical approach to that of the Taylor expansion given in Eq. (3). We have chosen a Fourier analysis as a more suitable technique for completely separating the on-axis and higher spatial frequency components. This gives the following form for $\exp(i\phi(x,y))$, where $(x,y) \in \Omega$:

$$\exp(i\phi(x,y)) = \tag{4}$$
$$\left(\int\int_\Omega dxdy\right)^{-1} \int\int_\Omega \exp(i\phi(x,y))dxdy + \text{"higher frequency terms"}$$

In this Fourier decomposition the first term is a complex valued constant linked to the on-axis focused light from a phase object defined within the spatial region, $\Omega$, and the second term describes light scattered by spatially varying structures in the phase object. Comparing Eq. (3) and Eq. (4) it is apparent that the first term of Eq. (3) is a poor approximation to the first term of Eq. (4) when operating beyond the Zernike small-scale phase regime.

An important issue to consider when analysing the effect of spatial filtering on the light diffracted by phase perturbations is the definition of what spatially constitutes focused and scattered light. In the previous description of Zernike phase contrast it was assumed that the focused light is spatially confined to a somewhat unphysical delta function. As we know, any aperture truncation such as occurs within a practical optical system will lead to a corresponding spatial broadening of the focused light. It is therefore essential that we define the terms "focused light" and "scattered light" explicitly for such a system. In this context it is necessary to look more carefully at the sequence of apertures confining the light wave propagation through a typical optical set-up.

A commonly applied architecture that provides an efficient platform for spatial filtering is illustrated in FIG. 1 and is based on the so-called 4-f configuration. An output interferogram of an unknown phase object or phase disturbance is obtained by applying a truncated on-axis filtering operation in the spatial frequency domain between two Fourier transforming lenses (L1 and L2). The first lens performs a spatial Fourier transform so that directly propagated light is focused into the on-axis filtering region whereas spatially varying object information generates light scattered to locations outside this central region. We can describe a general Fourier filter in which different phase shifts and amplitude damping factors are applied to the "focused" and "scattered" light. In FIG. 1, we show a circularly symmetric Fourier filter described by the amplitude transmission factors A and B for the "scattered" and "focused" light respectively and by the relative phase shift $\theta$. These filter parameters can be chosen to replicate any one of a large number of commonly used filter types (i.e. phase contrast, dark central ground, point diffraction and field-absorption filtering). By applying a given Fourier filter and a second Fourier lens, we obtain an interference pattern in the observation plane. The focused on-axis light acts as the synthetic reference wave (SRW) in the CPI system, this interferes with the scattered light to generate the output interference pattern. In the following section we discuss the importance of the SRW and show how it influences, among other things, the choice of the Fourier filter parameters.

Having described the generic optical system that makes up the CPI, we turn to a detailed analytical treatment of the important elements in this system. Assuming a circular input aperture with radius, $\Delta r$, truncating the phase disturbance modulated onto a collimated, unit amplitude, monochromatic field of wavelength, $\lambda$, we can describe the incoming light amplitude $a(x,y)$ by, $$a(x,y) = \text{circ}(r/\Delta r)\exp(i\phi(x,y)) \tag{5}$$

at the entrance plane of the optical system shown in FIG. 1 using the definition that the circ-function is unity within the region, $r = \sqrt{x^2+y^2} \leq \Delta r$, and zero elsewhere.

Similarly, we assume a circular on-axis centred spatial filter of the form:

$$H(f_x,f_y) = A[1+(BA^{-1}\exp(i\theta)-1)\text{circ}(f_r/\Delta f_r)] \tag{6}$$

where $B \in [0; 1]$ is the chosen filter transmittance of the focused light, $\theta \in [0; 2\pi]$ is the applied phase shift to the focused light and $A \in [0; 1]$ is a filter parameter describing field transmittance for off-axis scattered light as indicated in FIG. 1. The spatial frequency coordinates are related to spatial coordinates in the filter plane such that:

$$(f_x, f_y) = (\lambda f)^{-1}(x_f, y_f) \text{ and } f_r = \sqrt{f_x^2 + f_y^2}. $$

Performing an optical Fourier transform of the input field from Eq. (5) followed by a multiplication with the filter parameters in Eq. (6) and a second optical Fourier transform (corresponding to an inverse Fourier transform with inverted coordinates) we obtain an expression for the intensity $I(x',y')$ describing the interferogram at the observation plane of the 4-f set-up:

$$I(x',y') = A^2 |\exp(i\phi(x',y'))\text{circ}(r'/\Delta r) + |\bar{\alpha}|(BA^{-1}\exp(i\theta) - 1)g(r')|^2 \quad (7)$$

where $g(r')$ is the synthetic reference wave (SRW) and the terms $\bar{\alpha}$ and $\tilde{\phi}(x',y')$ are given by:

$$\begin{cases} \bar{\alpha} = (\pi(\Delta r)^2)^{-1} \iint\limits_{\sqrt{x^2+y^2} \leq \Delta r} \exp(i\phi(x,y))dxdy = |\bar{\alpha}|\exp(i\phi_{\bar{\alpha}}) \\ \tilde{\phi}(x',y') = \phi(x',y') - \phi_{\bar{\alpha}} \end{cases} \quad (8)$$

It should be noted that to achieve a tractable analytic expression in Eq. (7) it has been assumed that the spatial frequency content of the phase object is sufficiently described by the term, $\bar{\alpha}$, within the on-axis centred filtering region characterized by the spatial frequency range $\Delta f_r$.

The generally complex valued and object dependent term, $\bar{\alpha}$, corresponding to the amplitude of the focused light plays a significant role in the expression for the interference pattern described by Eq. (7). Referring to the discussion in the introduction, we are now able to confirm that the frequent assumption, that the amplitude of the focused light is approximately equal to the first term of the Taylor expansion in Eq. (1), can generally result in misleading interpretations of the interferograms generated at the CPI output.

Of similar importance in the analysis of Eq. (7) is the term $g(r')$ describing the spatial profile of the SRW, diffracted from the aperture formed by the on-axis centred filtering region. It is the interference between this SRW term, carrying the information about the filtering parameters, and the imaged phase object that generates the output interferogram. Thus, it is important to obtain an accurate description for the SRW and thereby an accurate derivation for Eq. (7). The zero-order Hankel transform followed by a series expansion in the spatial dimension, $r'$, will be used to describe the SRW. This is a relatively simple approach, which to the knowledge of the author has not previously been applied to this problem.

For a circular input aperture with radius, $\Delta r$, we can describe the radius of the corresponding central phase shifting region of the Fourier filter (characterized by the parameters B and $\theta$) in terms of a radial spatial frequency range $\Delta f_r$. We can thus obtain the following expression for the SRW by use of the zero-order Hankel transform:

$$g(r') = 2\pi\Delta r \int_0^{\Delta f_r} J_1(2\pi\Delta r f_r) J_0(2\pi r' f_r) df_r \quad (9)$$

In order to simplify the analysis, we introduce a term $\eta$, which explicitly relates the radius of the central filtering region, $R_1$, to the radius of the main-lobe of the Airy function, $R_2$, resulting from the Fourier transform of the circular input aperture alone. We can thus express $\eta$ in terms of $\Delta r$ and $\Delta f$, such that:

$$\eta = R_1/R_2 = (0.61)^{-1}\Delta r\Delta f_r \quad (10)$$

where the factor of 0.61 arises from the radial distance to the first zero crossing of the Airy function corresponding to half of the Airy mainlobe factor, of 1.22. If we make this substitution in Eq.(9) and then perform a series expansion in r', we obtain the following expression for the SRW:

$$g(r') = 1 - J_0(1.22\pi\eta) - [(0.61\pi\eta)^2 J_2(1.22\pi\eta)](r'/\Delta r)^2 + \{[(0.61\pi\eta)^3/4][2J_3(1.22\pi\eta) - 0.61\pi\eta J_4(1.22\pi\eta)]\}(r'/\Delta r)^4 \quad (11)$$

In this expansion, the SRW is expressed in radial coordinates normalised to the radius of the imaged input aperture. This can easily be scaled to allow for a magnification within the imaging system, though for the remainder of our analysis a direct imaging operation is assumed. From Eq.(11) it is apparent that the SRW will change as a function of the radius of the central filtering region. Additionally, it is clear that the SRW profile is not necessarily flat over the system output aperture. This is an important, yet often neglected, factor in determining the performance of a CPI.

Depending on the accuracy needed for the description of the interferograms one can choose to include a number of spatial higher order terms from the expansion in Eq. (11). The influence of the higher order terms has the largest impact along the boundaries of the imaged aperture. For $\eta$-values smaller than 0.627 and when operating within the central region of the image plane, spatial higher order terms are of much less significance and we can safely approximate the synthetic reference wave with the first and space invariant term in Eq. (11):

$$g(r' \in \text{central region}) \approx 1 - J_0(1.22\pi\eta) \quad (12)$$

so that we can simplify Eq. (7) to give:

$$I(x',y') \approx A^2 |\exp(i\phi(x',y')) + K|\bar{\alpha}|(BA^{-1}\exp(i\theta) - 1)|^2 \quad (13)$$

where $K = 1 - J_0(1.22\pi\eta)$. The influence of the finite on-axis filtering radius on the focused light is thus effectively included as an extra "filtering parameter" so that the four-parameter filter set $(A, B, \theta, K(\eta))$ together with the complex object dependent term, $\bar{\alpha}$, effectively defines the type of filtering scheme we are applying.

Having determined a suitable operating range for the CPI in terms of the production of a good SRW, we must now examine the role that the remaining filter parameters play in the optimisation of a CPI.

From Eq. (13) we see that the filter parameters $(A, B, \theta)$ can be combined to form a single complex valued term, C, the combined filter term, such that:

$$C = |C|\exp(i\psi_C) = BA^{-1}\exp(i\theta) - 1 \quad (14)$$

therefore, Eq. (13) can be simplified to give:

$$I(x',y') = A^2 |\exp(i\phi(x',y') - i\psi_C) + K|\bar{\alpha}||C||^2 \quad (15)$$

where $$\begin{cases} BA^{-1} = \sqrt{1 + 2|C|\cos(\psi_C) + |C|^2} \\ \sin\theta = (BA^{-1})^{-1}|C|\sin(\psi_C) \end{cases} \quad (16)$$

Since it is a complex variable, the combined filter term C, which effectively describes the complex filter space, can be considered to consist of a vector of phase $\psi_C$ and length $|C|$ as shown in Eq.(14). Thus in order to obtain an overview of the operating space covered by all the possible combinations of three independent filter parameters $(A,B,\theta)$ we can now instead choose to consider a given filter in terms of the two combined parameters $\psi_C$ and $|C|$. However, referring to Eq. (15), it can be seen that the filter parameter, A, also appears independently of the combined filter term, C. Fortunately, this issue can be resolved by considering that the term $BA^{-1}$ from Eq. (14) must be constrained in the following way:

$$\begin{cases} BA^{-1} < 1 & \Rightarrow A = 1 \quad B = |C+1| \\ BA^{-1} = 1 & \Rightarrow A = 1, \quad B = 1 \\ BA^{-1} > 1 & \Rightarrow B = 1, \quad A = |C+1|^{-1} \end{cases} \quad (17)$$

These constraints arise from the adoption of a maximum irradiance criterion minimising unnecessary absorption of light in the Fourier filter, which reduces both irradiance and the signal to noise ratio in the CPI output.

In the previous sections we derived expressions and graphical analysis methods relating the spatial average value of a given phase disturbance to obtain peak irradiance and optimal visibility in combination with high accuracy in systems with unknown wavefront phase disturbances. We saw that if a CPI is applied to wavefront sensing or the visualisation of unknown phase objects the Generalised Phase Contrast (GPC) method specifies the filter phase and aperture size parameters for achieving optimal performance in extracting and displaying the phase information carried by the incoming wavefront. On the other hand, in cases where we have control over the incoming wavefront or phase modulation the GPC method provides extra means of optimisation by encoding the phase distribution itself in addition to modifying the filter parameters. The two main scenarios: A) synthesizing the spatial phase for intensity display or B) measuring the spatial phase with high accuracy, strongly influences which of the parameters in the analysis that should be kept fixed and which could be changed or adapted. The first approach is particularly useful when the filter parameters have a restricted dynamic range or are fixed. The rigorous derivation of the equations for choosing these parameters will be derived in this section.

When synthesizing an input phase distribution for optimal visibility of an output intensity pattern the situation is more relaxed than the situation involving accurate interferometric measurements of unknown phase disturbances. The parameter $\eta$ can therefore in most cases be chosen to completely encompass the zero-order light with the result that the term, K, tends to unity as the Bessel function tends to zero in Eq. (12). For this particular case, the SRW becomes a flat top profile where we can achieve nearly 100% light efficiency. For smaller and irregular phase patterns fine-tuning of $\eta$ in the region 0.4-0.6 provides for an efficient operating regime while maintaining minimal losses.

In order to optimize a synthesized light distribution we wish to generate a dark background for the illumination at the observation plane as our principal design criterion, so we can write:

$$I(x'_0, y'_0; \phi_0) = 0 \quad (20)$$

where $(x_0', y_0')$ indicates observation plane coordinates of the background of the generated illumination and $\phi_0$ is the relative phase shift generating a zero-intensity level at the observation plane.

Applying this dark background condition in Eq. (13) we can obtain the following expression for a no-loss phase-only filter with filter transmission parameters, A=B=1:

$$K|\bar{\alpha}|(1-\exp(i\theta)) = \exp(i\phi_0) \quad (21)$$

A key point arising from Eq. (21) is that we now have a simple way of expressing a new design criterion relating the spatial average value of any input phase pattern to the zero-order phase shift of a matched Fourier phase filter. Since K is by definition positive and by taking the modulus of Eq. (21) we obtain:

$$K|\bar{\alpha}| = |2\sin(\theta/2)|^{-1} \quad (22)$$

Eq. (22) is a key result for the fully transmissive wavefront engineered GPC mapping that makes it possible to deduce the range of valid phase parameters fulfilling our design criteria from Eq. (20). The largest possible value that the term, $K|\bar{\alpha}|$, takes on is unity, this leads to the following solution interval for Eq. (22) within a full phase-cycle:

$$\theta = [\pi/3; 5\pi/3] \quad (23)$$

From Eq. (22) we also observe that $K|\bar{\alpha}|$ can take on a value limited to the interval:

$$K|\bar{\alpha}| = [½; 1] \quad (24)$$

Eq. (22) and the solution intervals described by Eqs. (23)-(24) specify the design parameters for achieving optimal performance in extracting and displaying the phase information carried by the incoming wavefront. Moreover, Eq. (22) hints towards extra means of optimisation by encoding the phase modulation depth itself in addition to the no-loss phase-only filter. This last approach is particularly useful when the filter phase has a restricted dynamic range or is fixed.

Now, assuming that we have a fixed and fully transmissive phase-only filter, the best choice for the filter parameter is a value that allows for the largest dynamic range of phasor values at the input. Accordingly, the smallest possible real value, $K\bar{\alpha}=½$, Is desirable implying that $\theta=\pi$, leading to the output intensity distribution:

$$I(x', y') = 2[1 - \cos(\phi(x', y'))] \quad (25)$$

Inserting $K\bar{\alpha}=½$ in Eq. (8) we obtain the following two requirements for the input encoded phase function $\phi(x,y)$:

$$\begin{cases} KA^{-1} \int\int_A \cos(\phi(x,y)) dx dy = \frac{1}{2} \\ KA^{-1} \int\int_A \sin(\phi(x,y)) dx dy = 0 \end{cases} \quad (26)$$

We observe that it is only the first requirement in Eq. (26) that is directly related to the output intensity in Eq. (25) via the cosine term. Since there are always two choices for a given phasor value that result in the same cosine value (excluding 0 and $\pi$), we notice that the second requirement can subsequently be fulfilled independently of the first requirement simply by complex conjugating an appropriate number of phasor values. This fact is a key feature of the GPC-method since it makes it possible to solely concentrate on the first requirement in the process of synthesizing a desired an virtually no-loss grey level intensity pattern.

The first requirement in Eq. (26) can be fulfilled by several means, including: dynamic phase range adjustment, fill factor encoding, phase-histogram adjustment, spatial scaling of phasor pattern, raster encoding etc. In a histogram adjustment technique one will typically start out with a desired relative intensity distribution $I(x',y')_{desired}$ where the maximum achievable intensity level is unknown but relative intensity levels are known and the lowest intensity level is fixed by the background criterion of Eq. (20). The procedure is now to adjust the histogram for $I(x',y')_{desired}$ while maintaining identical relative intensity level ratios until the first requirement in Eq. (26) is fulfilled. Subsequently, the second requirement in Eq. (26) is fulfilled by complex conjugating an appropriate part of the phasors. The simplest procedure is to complex conjugate every second identical phasor value independently of the spatial location. However, this "phasor flipping" procedure can also be turned into an advantageous tool (an extra degree of freedom) for manipulating the spatial frequency content in order to optimize the separation of low and high spatial frequency terms at the Fourier filter plane by taking the spatial phasor location into account. E.g. neighbouring phasor values can be chosen to have a maximum difference between them, thereby introducing high spatial frequency modulation easing the filtering in the spatial Fourier domain.

In most cases, however, equalized output intensity levels are sufficient. In the succeeding analysis, we therefore focus on the encoding of the input phase levels to achieve binary output intensity levels. A derivation based on ternary phase levels allows for the widest range of binary intensity pattern encoding and automatically provides for the simplified but important binary phase level encoding as a special case.

For the ternary phase encoding, we consider the illuminated portion of the input aperture area, A, as divided into sub-areas $A_0$, $A_1$ and $A_2$ with respective phase values $\phi_0$, $\phi_1$ and $\phi_2$. We are aiming for the derivation of general expressions relating the addressing parameters for the phase modulation to the range of possible phase parameters of the Fourier filter obeying the design criterion we have already set out. We can express the total truncated area and its average phase modulation, as the sum of the phase-weighted sub-areas:

$$A_0 \exp(i\phi_0) + A_1 \exp(i\tilde{\phi}_1) + A_2 \exp(i\tilde{\phi}_2) = A|\bar{\alpha}| \quad (27)$$

This can be further simplified by expressing the sub-areas as fractions of the total area, A, such that $F_1 = A_1/A$ and $F_2 = A_2/A$:

$$(1-F_1-F_2)\exp(i\tilde{\phi}_0) + F_1 \exp(i\tilde{\phi}_1) + F_2 \exp(i\tilde{\phi}_2) = |\bar{\alpha}| \quad (28)$$

As previously mentioned we are interested in binary intensity patterns with levels corresponding to the input phase values. In this case the dark background region is defined by $(A_0,\phi_0)$ and the bright output level of intensity, I, is determined by $(A_1,\phi_1)$ and $(A_2,\phi_2)$ at the input plane. For the binary output intensity condition it follows that:

$$I(\phi_1) = I(\phi_2) \quad (29)$$

This equality corresponds to a symmetric condition that can be easily verified applying the phasor chart analysis technique demonstrated in section 4. Due to this symmetry we can simplify the analysis by applying the following substitution:

$$\Delta\phi = \phi_1 - \phi_0 = \phi_0 - \phi_2 \quad (30)$$

so that Eq.(28) can be rewritten as:

$$F_1(\exp(i\Delta\phi)-1) + F_2(\exp(-i\Delta\phi)-1) = K^{-1}(1-\exp(i\theta))^{-1} - 1 \quad (31)$$

It is now a straightforward task to solve Eq. (31) for the real part and the imaginary part respectively, to obtain the following set of equations:

$$\begin{cases} F_1 + F_2 = (2K-1)(2K(1-\cos(\Delta\phi)))^{-1} \\ F_1 - F_2 = \sin(\theta)(2K\sin(\Delta\phi)(1-\cos(\theta)))^{-1} \end{cases} \quad (32)$$

This can also be expressed in terms of the fractional areas, such that:

$$\begin{cases} F_1 = (4K)^{-1}[(2K-1)(1-\cos(\Delta\phi))^{-1} + \sin(\theta)(\sin(\Delta\phi)(1-\cos(\theta)))^{-1}] \\ F_2 = (4K)^{-1}[(2K-1)(1-\cos(\Delta\phi))^{-1} - \sin(\theta)(\sin(\Delta\phi)(1-\cos(\theta)))^{-1}] \end{cases} \quad (33)$$

Since we have focused on solutions where identical intensity levels are obtained in both the $F_1$-region and the $F_2$-region we can define the resulting illumination compression factor, C, in the following way:

$$C = (F_1 + F_2)^{-1} = (1-(2K)^{-1})^{-1}(1-\cos(\Delta\phi)) \quad (34)$$

The minimum compression factor corresponds to uniform illumination at the output such that $F_1 + F_2 = 1$, whereas the maximum compression factor is found to be $C \to \infty$ for $K = \frac{1}{2}$.

An interesting special case can be deduced from Eq. (31) by setting $F_2 = 0$, where we find that:

$$F = F_1 = (K(1-\exp(i\theta))-1)(K(1-\exp(i\Delta\phi))(1-\exp(i\theta)))^{-1} \quad (35)$$

implying that for the binary phase modulation case we must have:

$$\Delta\phi = \theta \quad (36)$$

in order for the fill factor, F, to be real-valued.

This result turns out to be the special case that corresponds to the set of solutions where a binary phase pattern serves as the input.

DETAILED DESCRIPTION OF PREFERRED EMBODIMENTS

Figure 1:
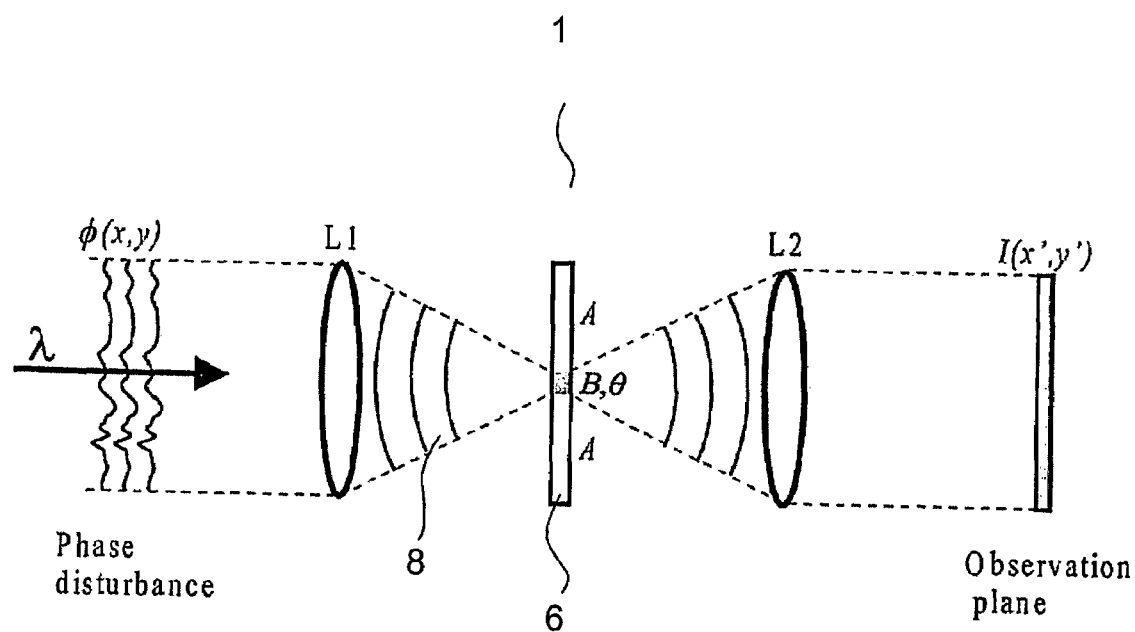
FIG. 1 illustrates schematically a known phase contrast imaging system.

FIG. 1 shows a known phase contrast imaging system embodied in a 4f common path interferometer 1. A laser emits a light beam, which is expanded by a beam expander into a plane light wave of uniform intensity and directs it towards a phase modifying element. The light beam is transmitted through the phase modifying element and a Fourier transforming lens (L1). The phase modifying element is positioned in the front focal plane of the lens (L1) and a spatial phase filter 6 is positioned in the back focal plane of the lens L1 that is also the front focal plane of a lens L2. The Fourier transforming lenses L1, L2 need not have identical focal lengths. Different focal lengths lead to a magnification ratio different from one. The spatial phase filter 6 phase shifts by θ, and optionally attenuates (by a factor B), the zero order diffraction part 8 of the light modulated by the phase modifying element. Optionally, the remaining diffraction part of the light modulated by the phase modifying element may be attenuated by a factor A. The reconstructed intensity pattern I(x', y') is generated in the back focal plane 9 of the lens L2.

Figure 2:
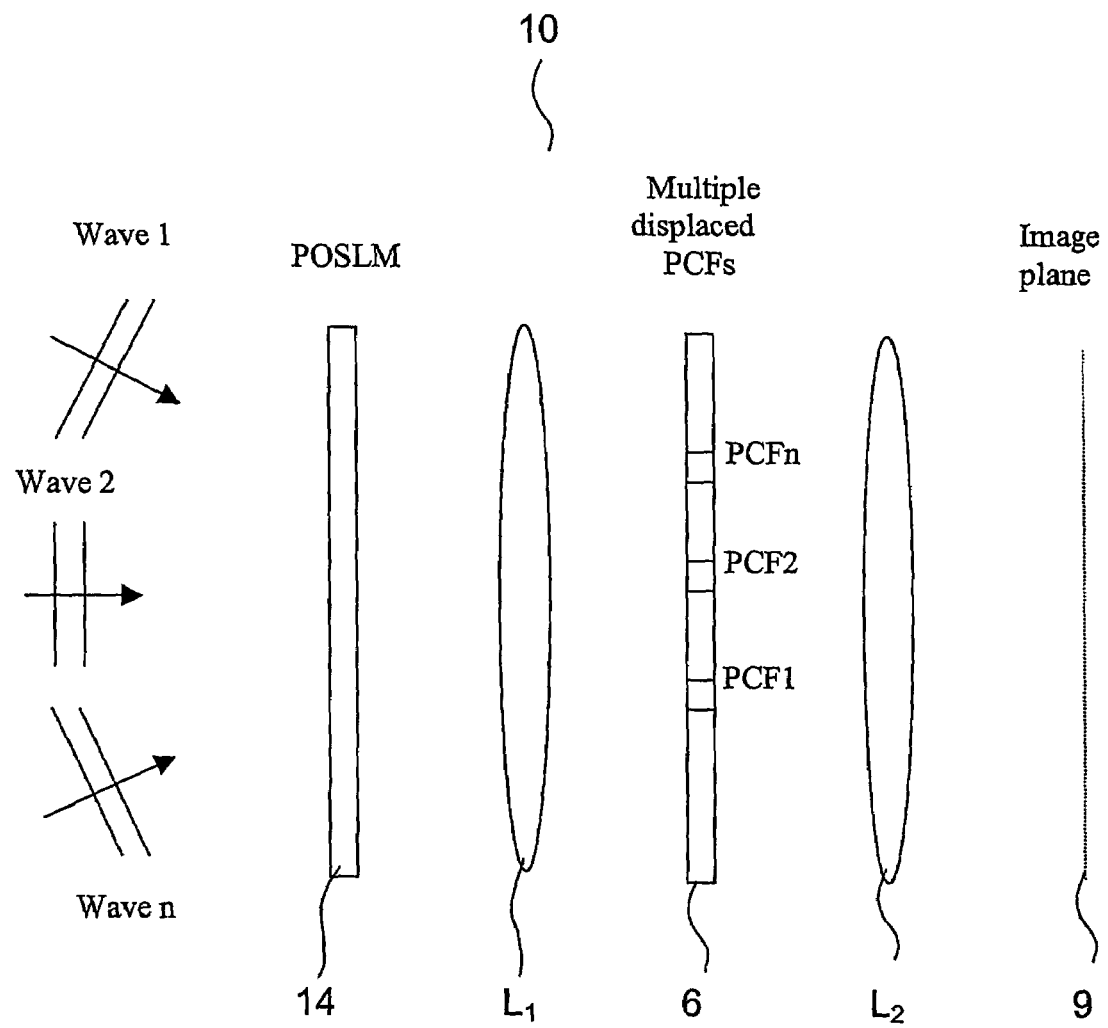
FIG. 2 illustrates schematically an embodiment of the present invention.
Figure 3:
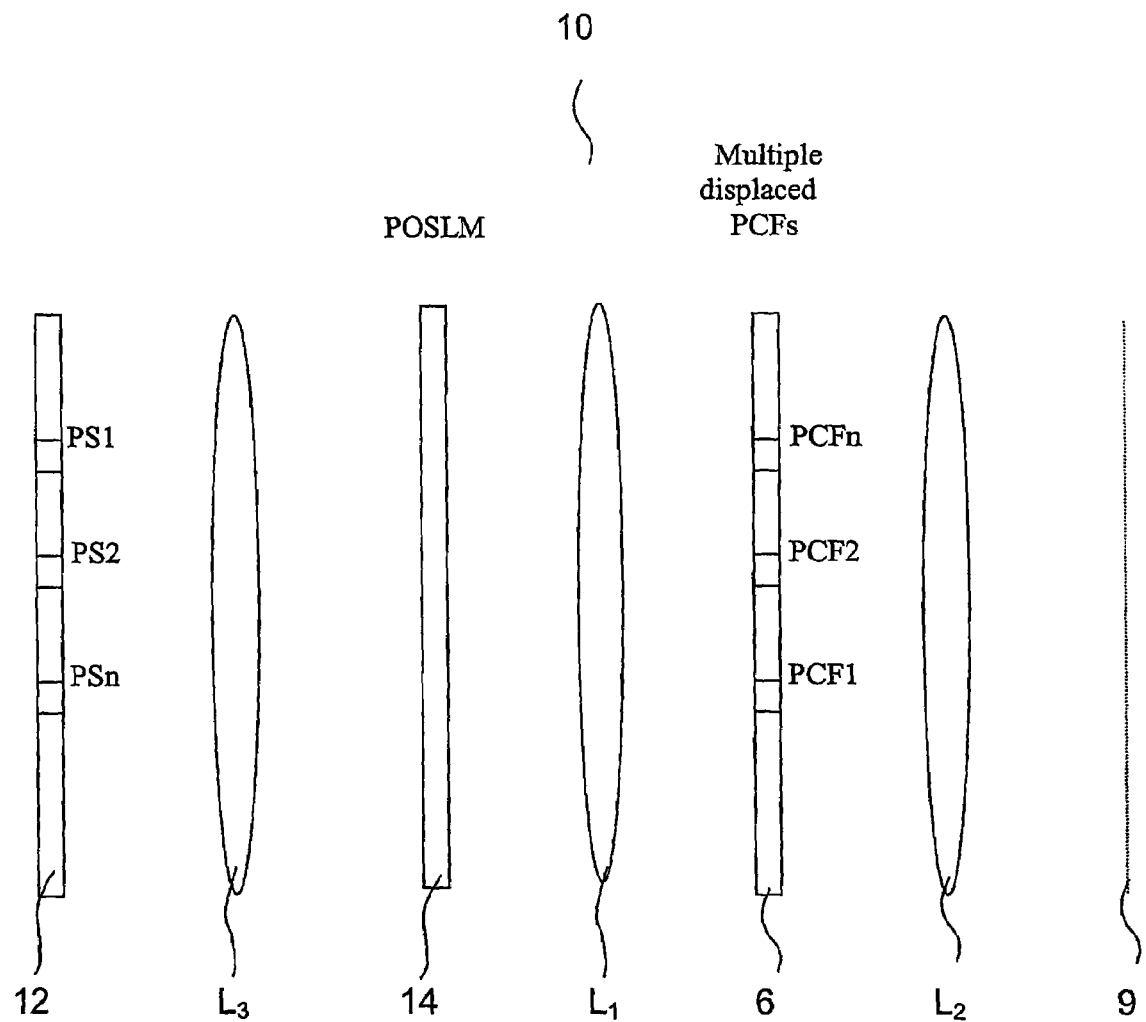
FIG. 3 also schematically illustrates the embodiment of FIG. 2.

FIGS. 2 and 3 illustrate schematically an embodiment 10 of the present invention in a 4f common path interferometer configuration. An array 12 with a plurality of individual light sources $PS_1$, $PS_2$, ..., $PS_n$ emits a set of light beams $Wave_1$, $Wave_2$, ..., $Wave_n$, which are collimated by lens L3 into a plurality of plane light waves directed towards a phase modifying element 14 to be incident upon the element at different respective angles of approach. The phase modifying element 14 phase modulates the electromagnetic fields by phasor values $e^{i\phi(x,y)}$. (x, y) are coordinates of the resolution elements or pixels of the phase modifying element 14. The light waves are transmitted through the phase modifying element 14 and a Fourier transforming lens L1. The phase modifying element 14 is positioned in the front focal plane of the lens L1, and a spatial phase filter 6 is positioned in the back focal plane of the lens L1 that is also the front focal plane of a lens L2. The Fourier transforming lenses L1, L2 need not have identical focal lengths. Different focal lengths lead to a magnification ratio different from one. In each phase shifting region $PCF_1$, $PCF_2$, ..., $PCF_n$, the spatial phase filter 6 phase shifts by respective values $θ_1, θ_2, ... θ_n$ and optionally attenuates (by respective factors $B_1, B_2, ..., B_n$) the respective n'th zero-order diffraction part of the light modulated by the phase modifying element 14. Optionally, the remaining diffraction part of the light modulated by the phase modifying element may be attenuated by a factor A. The reconstructed intensity pattern I(x', y') is generated in the back focal plane 9 of the lens L2.

The illustrated system 10 may be controlled by a computer (not shown), comprising interface means for addressing each of the resolution elements of the phase modifying element 14 and transmitting a phasor value $e^{i\phi(x,y)}$ to the addressed resolution element (x, y). Further, the computer may comprise light control means for controlling the power of the light-emitting array 12. The computer may also comprise input means, such as a keyboard, a diskette drive, an optical disc drive, a network interface, a modem, etc, for receiving an image pattern to be synthesized by the system 10. From the received image pattern, the computer may be adapted to calculate phasor values to be transmitted to the resolution elements (x, y) of the phase modifying element 14, e.g. based on a histogram technique as described herein. Optionally, the phase shifts of the spatial phase filter 6 may be adjustable and controllable by optional phase control means of the computer, which may be further adapted to adjust the phase shift.

Figure 4:
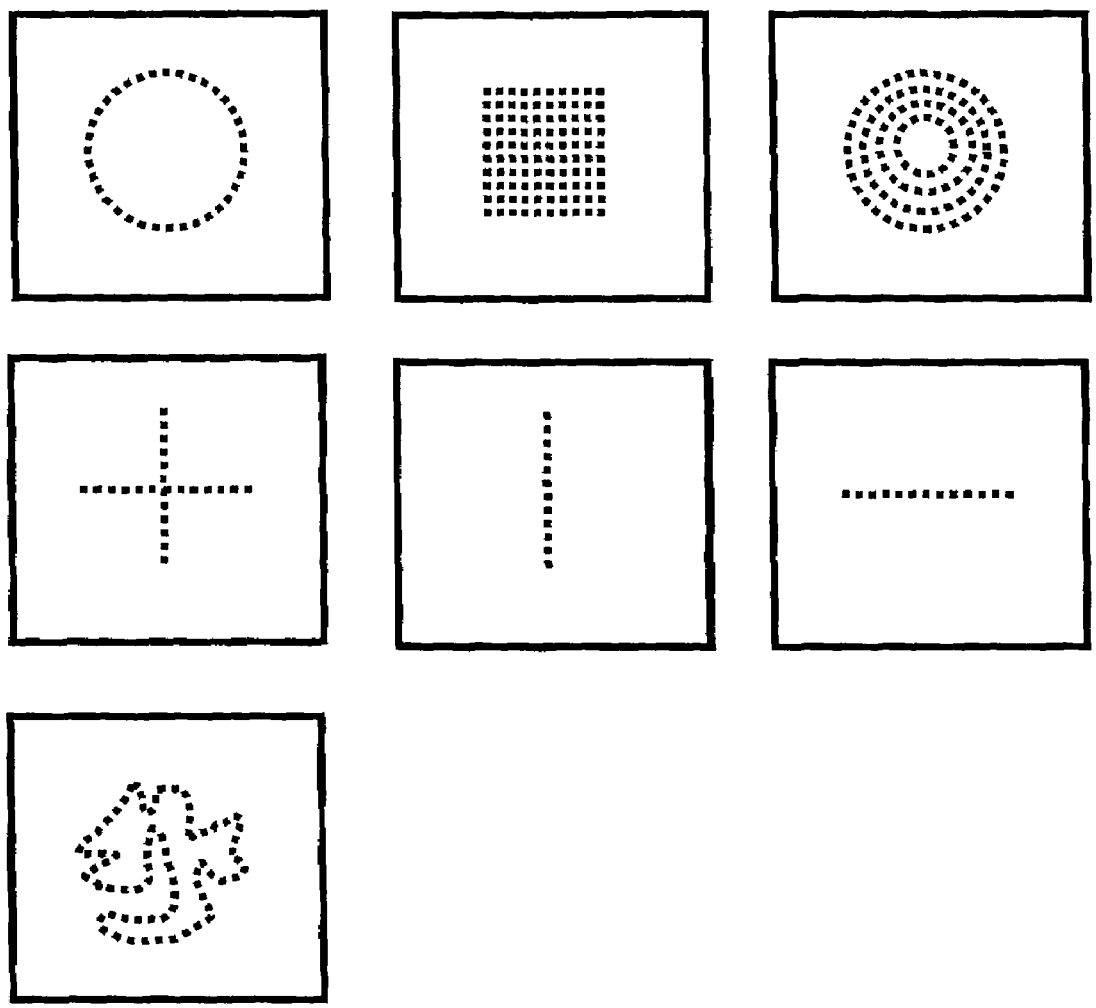
FIG. 4 illustrates various layouts of the spatial phase filter according to the present invention.

FIG. 4 illustrates various layouts of the spatial phase filter according to the present invention for illustration of the flexibility provided by the invention. The illustrated layouts match corresponding layouts of source arrays.

Figure 5:
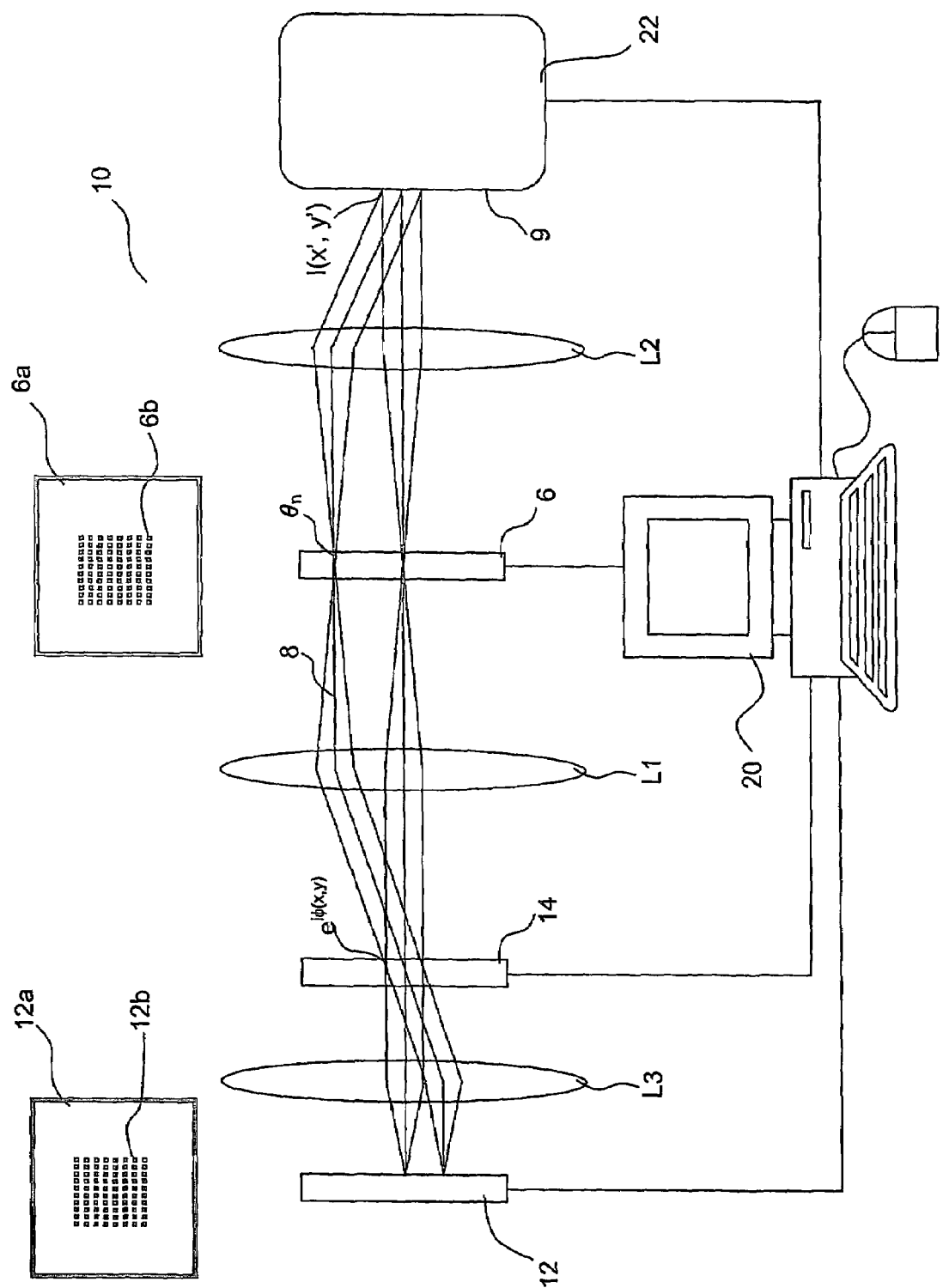
FIG. 5 illustrates schematically another embodiment of the invention.

FIG. 5 illustrates schematically an embodiment 10 of the present invention in a 4f common path interferometer configuration. An array 12 with a layout 12a of a plurality of individual light sources 12b emits a set of light beams, which are collimated by lens L3 into a plurality of plane light waves directed towards a phase modifying element 14 to be incident upon the element 14 at different respective angles of approach. The phase modifying element 14 phase modulates the electromagnetic fields by phasor values $e^{i\phi(x,y)}$, (x, y) are coordinates of the resolution elements or pixels of the phase modifying element 14. The light waves are transmitted through the phase modifying element 14 and a Fourier transforming lens L1. The phase modifying element 14 is positioned in the front focal plane of the lens L1, and a spatial phase filter 6 with a layout 6a of a plurality of individual phase shifting areas 6b is positioned in the back focal plane of the lens L1 that is also the front focal plane of a lens L2. The Fourier transforming lenses L1, L2 need not have identical focal lengths. Different focal lengths lead to a magnification ratio different from one. Each of the phase shifting areas 6b of the spatial phase filter 6 phase shifts light incident upon it by $θ_n$, and optionally attenuates (by a factor B). The light incident upon it is constituted by the zero order diffraction part 8 of light emitted from a corresponding laser 12b of the laser array 12a and modulated by the phase modifying element 14. Optionally, the remaining diffraction part of the light modulated by the phase modifying element may be attenuated by a factor A. The reconstructed intensity pattern I(x', y') is generated in the back focal plane 9 of the lens L2.

The illustrated system 10 may be controlled by a computer 20 comprising interface means for addressing each of the resolution elements of the phase modifying element 14 and transmitting a phasor value $e^{i\phi(x,y)}$ to the addressed resolution element (x, y). Further, the computer may comprise light control means for controlling the output of the array 12. The computer may also comprise input means, such as a keyboard, a mouse, a diskette drive, an optical disc drive, a network interface, a modem, etc, for receiving an image pattern to be synthesized by the system 10. From the received image pattern, the computer may be adapted to calculate phasor values to be transmitted to the resolution elements (x, y) of the phase modifying element 14, e.g. based on a histogram technique as described herein. Optionally, the phase shifts of the spatial phase filter 6 may be adjustable and controllable by optional phase control means of the computer, which may be further adapted to adjust the phase shift. An imaging system captures the synthesized intensity pattern (x', y') and transmits it to the computer 20 for display to the user and for possible automatic adjustment. A user of the system may move individual light beams around using the mouse.

Proposed Applications:
  Laser machine tool e.g. for shaping, forming, assembling, etc, such as cutting, drilling, milling, planing, marking, branding, trimming, hardening, scribing, labelling, welding, soldering, two- and three-dimensional surfaces especially by use of $CO_2$ and Nd:YAG laser based systems. The main advantage is that energy is not absorbed in the system according to the present invention (thereby preventing damage of the optical hardware) and this non-absorbed energy is instead utilized to increase the intensity level of the desired light distribution in the image plane. High power can be delivered to selected regions on a work piece simultaneously.
  Optical tweezer array for manipulation of micro-objects, such as micro-components, biological cells, etc, using electromagnetic gradient forces proportional to the optical intensity pointing in the direction of the intensity gradient.
  Efficient and dynamic spot-array generators based on phase contrast imaging. In order to provide bias or holding beams for arrays of optoelectronic elements, such as bistable elements, photonic switches and smart pixels.
  Generation of structured light (loss less) for machine vision applications. E.g. periodic and skew periodic mesh grid illumination that can be updated in parallel.

Photolithographic applications (laser 3D direct writing in parallel without the need for sequential scanning). E.g. high power laser direct writing of waveguides in Ge-doped silica.

Spatial light intensity modulation in general by use of pure phase modulation (radiation focusators).

Laser beam shaping (dynamic).

Highly efficient parallel image projection without the need for a laser-scanning device.

Dynamic Infrared Scene Projection (DIRSP).

Exposure device for grating and mask production.

LIDAR applications.

Laser printing in parallel.

Laser show applications.

Atmosphere research.

The invention claimed is:

1. A phase contrast system for synthesizing an intensity pattern I(x', y'), comprising
a source of electromagnetic fields for emission of at least two substantially plane electromagnetic fields with different axes of propagation,
a phase modifying element for phase modulation of the electromagnetic fields by phasor values $e^{i\phi(x,y)}$ and positioned so that the at least two electromagnetic fields are incident upon it at different respective angles of approach,
first Fourier or Fresnel optics for Fourier or Fresnel transforming the phase modulated electromagnetic fields positioned in the propagation paths of the at least two phase modulated fields,
a spatial phase filter with at least two phase shifting regions positioned at respective zero-order diffraction regions of the at least two respective phase modulated electromagnetic fields for individually phase shifting the at least two respective Fourier or Fresnel transformed electromagnetic fields by predetermined respective phase shift values $\theta_n$ in relation to the remaining part of the at least two respective transformed electromagnetic fields, and
second Fourier or Fresnel optics for forming the intensity pattern I(x', y') by Fourier or Fresnel transforming the at least two respective phase shifted Fourier or Fresnel transformed electromagnetic fields,
characterized in that
the phasor values $e^{i\phi(x,y)}$ of the phase modifying element and the phase shift values $\theta_n$ substantially fulfilling that $$I(x', y') \cong \sum_n S(n)A^2 |\exp(i\tilde{\phi}(x', y')) + K_n|\overline{\alpha}|(B_n A^{-1} \exp(i\theta_n) - 1)|^2$$

for selected phase shift values $\theta_n$,
wherein
A is an optional amplitude modulation of the spatial phase filter outside the zero-order diffraction regions,
$B_n$ is an optional amplitude modulation of the spatial phase filter in the respective n'th zero-order diffraction region,
$\overline{\alpha} = |\overline{\alpha}| \exp(i\phi_{\overline{\alpha}})$ is the average of the phasors $e^{i\phi(x,y)}$ of the resolution elements of the phase modifying element, and
$\tilde{\phi} = \phi - \phi_{\overline{\alpha}}$, and
S(n) is the intensity of the n'th electromagnetic field, and
$K_n = 1 - J_0(1.22\pi\eta_n)$, wherein
$J_0$ is the zero-order Bessel function, and
$\eta_n$ relates the radius $R_{1n}$ of the n'th zero-order filtering region to the radius $R_2$ of the main-lobe of the Airy function of the input aperture, $\eta_n = R_{1n}/R_2$,
except
when the phase modifying element has fixed phasor values $e^{i\phi(x,y)}$ and
1)

$$\theta_n = \frac{\pi}{2}$$

and the phase shifting area of the phase filter is annular, or,
2) $\theta_n = \pi$ and the phase filter is divided into a plurality of rows, every second row having phasor value $e^{i\pi}$ and being interlaced with the remaining rows having the phasor value $e^{i0}$.

2. A phase contrast system according to claim 1, wherein the phase modifying element has an input for reception of signals for addressing the resolution elements (x, y) and for adjusting the phasor values $e^{i\phi(x,y)}$ of the respective addressed resolution elements (x, y).

3. A phase contrast system according to claim 2, further comprising a controller with a first output that is connected to the input of phase modifying element, and a second output that is connected to the spatial phase filter and being adapted for adjusting phasor values $e^{i\phi(x,y)}$ of the phase modifying element and phase shift values $\theta_n$ of the spatial phase filter.

4. A phase contrast system according to claim 2, wherein the controller further comprises a user interface and being adapted for adjusting phasor values $e^{i\phi(x,y)}$ of the phase modifying element and phase shift values $\theta_n$ of the spatial phase filter in accordance with user inputs.

5. A phase contrast system according to claim 1, wherein the phase shifting regions of the spatial phase filter form a rectangular array.

6. A phase contrast system according to claim 1, wherein the phase shifting regions of the spatial phase filter form a circular array.

7. A phase contrast system according to claim 1, wherein the phase shifting regions of the spatial phase filter form a linear array.

8. A phase contrast system according to claim 1, wherein the phase shifting regions of the spatial phase filter form two linear crossing arrays.

9. A phase contrast system according to claim 1, wherein the phase shifting regions form a continuous region.

10. A phase contrast system according to claim 9, wherein the phase shifting regions of the spatial phase filter form a ring.

11. A phase contrast system according to claim 1, wherein the phase shifting regions of the spatial phase filter form an arbitrary array.

12. A phase contrast system according to claim 1, wherein

A=1.

13. A phase contrast system according to claim 1, wherein $B_n$=1.

14. A phase contrast system according to claim 1, wherein $\theta_n = \pi$.

15. A phase contrast system according to claim 1, wherein $K_n$=1.

16. A phase contrast system according to claim 1, wherein the source comprises a plurality of light sources.

17. A phase contrast system according to claim 1, wherein the source comprises a laser array, such as a VCSEL array.

18. A phase contrast system according to claim 1, wherein the source comprises a light scanner for time multiplexed emission of the at least two substantially plane electromagnetic fields with different axes of propagation.

19. An optical tweezer system according to claim 1.

20. An optical tweezer system according to claim 1, wherein the synthesized intensity pattern forms a set of non-interfering counter propagating beams.

21. A laser machining tool according to claim 1.

22. A method for synthesizing an intensity pattern $I(x', y')$, comprising the steps of dividing the intensity pattern $I(x',y')$ into pixels in accordance with the disposition of resolution elements $(x,y)$ of a phase modifying element having
- a plurality of individual resolution elements $(x,y)$, each resolution element $(x,y)$ modulating the phase of electromagnetic radiation incident upon it with a predetermined phasor value $e^{i\phi(x,y)}$, radiating at least two substantially plane electromagnetic fields with different axes of propagation towards the phase modifying element so that the at least two electromagnetic fields are incident upon it at different respective angles of approach, Fourier or Fresnel transforming the phase modulated electromagnetic fields, phase shifting in at least two phase shifting regions positioned at respective zero-order diffraction regions of the at least two respective phase modulated electromagnetic fields for individually phase shifting the at least two respective Fourier or Fresnel transformed electromagnetic fields by predetermined respective phase shift values $\theta_k$ in relation to the remaining part of the at least two respective transformed electromagnetic fields, and forming the intensity pattern $I(x', y')$ by Fourier or Fresnel transforming the at least two respective phase shifted Fourier or Fresnel transformed electromagnetic fields, calculating the phasor values $e^{i\phi(x,y)}$ of the phase modifying element and the phase shift values $\theta_n$ substantially in accordance with $$I(x', y') \cong \sum_n S(n)A^2 |\exp(i\tilde{\phi}(x', y')) + K_n|\overline{\alpha}|(B_n A^{-1}\exp(i\theta_n) - 1)|^2$$

for selected phase shift values $\theta_n$, wherein

A is an optional amplitude modulation of the spatial phase filter outside the zero-order diffraction regions, $B_n$ is an optional amplitude modulation of the spatial phase filter in the respective n'th zero-order diffraction region, $\overline{\alpha}=|\overline{\alpha}|\exp(i\phi_{\overline{\alpha}})$ is the average of the phasors $e^{i\phi(x,y)}$ of the resolution elements of the phase modifying element, and $\tilde{\phi}=\phi-\phi_{\overline{\alpha}}$, and $S(n)$ is the intensity of the n'th electromagnetic field, and $K_n=1-J_0(1.22\pi\eta_n)$, wherein $J_0$ is the zero-order Bessel function and $\eta_n$ relates the radius $R_{1n}$ of the n'th zero-order filtering region to the radius $R_2$ of the main-lobe of the Airy function of the input aperture, $\eta_n=R_{1n}/R_2$, selecting, for each resolution element, one of two phasor values which represent a particular grey level, and supplying the selected phasor values $e^{i\phi(x,y)}$ to the respective resolution elements $(x,y)$ of the phase modifying element.

\* \* \* \* \*